Dec. 14, 1965  H. MULDER  3,223,062
BUNG PATCH PLATE ASSEMBLY METHOD
Original Filed Jan. 24, 1961  3 Sheets-Sheet 1

United States Patent Office 3,223,062
Patented Dec. 14, 1965

3,223,062
BUNG PATCH PLATE ASSEMBLY METHOD
Harry Mulder, Akron, Ohio, assignor to The Firestone Tire & Rubber Company, Akron, Ohio, a corporation of Ohio
Original application Jan. 24, 1961, Ser. No. 84,568, now Patent No. 3,143,244, dated Aug. 4, 1964. Divided and this application Sept. 18, 1963, Ser. No. 313,719
8 Claims. (Cl. 113—120)

This application is a divisional application of my prior copending application Serial No. 84,568, filed January 24, 1961, now U.S. Patent No. 3,143,244, issued August 4, 1964.

This invention relates to containers, such as single-walled metal beer barrels, and the method of construction of the same.

The primary object of the invention is to provide an improved patch plate assembly for reinforcing and protecting the bung opening.

One of the probelms involved in the construction of a container having a single-walled thickness is to provide a protecting structure about the bung opening, through which the container may be cleaned, filled and drained. The bung opening also must be capable of withstanding the force exerted when the bung plug is driven therein.

Generally, bung patch plate assemblies around bung openings in beer barrels, for example, involve two separate walls or thicknesses of metal separated by a space, the latter being completely enclosed by the two metal walls. Normally, there is no opening leading to this space for the ingress or egress of liquids or gases. The two metal walls enclosing this space are sealed by the use of welds.

One or more of these welds, in prior art barrels are generally located so as to be in a position between the sealed space and the barrel cavity with the inner patch plate about the bung opening welded at its peripheral edges to the inside surfaces of the container. During the cleaning stages and prior to the filling of a single-walled metal beer barrel, it is inserted in a mold, filled with water and subjected to a pressure of approximately 900 lbs. per square inch in order to remove all dents to insure an exact volumetric capacity, and so that the barrel itself will present a more pleasing appearance. Therefore, it is not unusual that in the course of time and through other hard use, these welds sometimes become cracked.

When a crack occurs in a weld in the area between the enclosed space and barrel cavity, some of the beverage seeps into the enclosed space. The entrapped liquid decomposes and becomes extremely odious. When the containers or beer barrels are washed they are subjected to temperatures which vary greatly, the varying temperatures causing pressure changes within the enclosed space. These pressure changes cause seepages of the decomposed liquid from the space out of the crack in the weld(s), which seepages are not only offensive in smell and taste, but also are detrimental to the maintenance of high health standards.

The detection of a crack in a weld occuring in a location between the enclosed space and the beverage cavity presented a further problem. The crack could not be seen and usually the first time anyone knew of its presence would be because of the noxious smell. To repair such a crack it was necessary that one of the end shells be sawed off, the weld repaired from the inside of the barrel, and then the end shell placed back into position and secured by a fusion welding process. This was not only expensive, but was also time consuming in that the barrel generally had to be sent back to the place of manufacture or some other place where there were available facitities for so cutting and rewelding.

One of the objects of the invention is to avoid the above-mentioned problems by constructing the bung patch plate assembly so that there are no welds between the enclosed space and the beverage cavity.

Another object is to arrange all of the welds of the patch plate assembly on the outside of the container so that, in the event a weld does crack, the crack may be readily seen and repaired.

A further object of the invention is to provide a support within the space enclosed by the two metal walls designed to distribute over a wider area the stresses and strains occuring around the bung opening.

In meeting customer specification requirements in the construction of certain barrels it may not be structurally practical to avoid using at least one inside weld within the area concerned. Accordingly and under these circumstances, an additional object is to locate a weld in such position that the effect produced upon it by the above-mentioned stresses and strains will be negligible.

Other objects and advantages inherent in the nature of the improved construction will become apparent from the disclosure to one skilled in the cooperage art.

Figure 1:
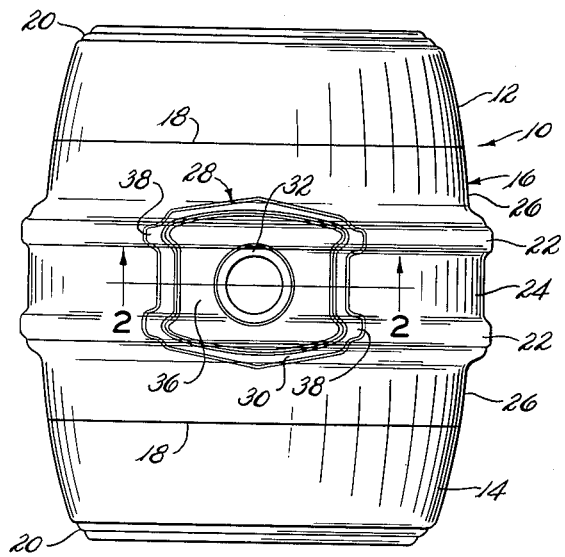
FIG. 1 is a plan view of a container or barrel illustrating the disposition of the bung opening and the patch plate assembly which surrounds the bung opening.

Referring in detail to the drawings, a container or barrel 10 is shown in FIG. 1. The barrel is economically assembled in stages, each part preferably being stamp formed from a sheet of metal, preferably stainless steel which is non-corrosive. When stainless steel is used, the assembled parts are secured together by a fusion welding process, such as the atomic hydrogen or helium process, which causes the metal at the juncture of two separate parts to flow together. The advantage is that no additional metal is added and the stainless steel does not corrode at the weld area.

Broadly, the container or barrel 10 is assembled from two cup-like end shell sections 12 and 14 and a cylindrical section or center band 16; the end shells being joined to the center band along the weld lines 18. Annular corrugations 20 are provided at the extremities of the end shells 12 and 14 for strengthening the ends against the rough usage which will be encountered during the life of the barrel.

Referring more in detail to the center band 16, it is formed into a flat rectangular shape from a sheet of stainless steel. Its ends are brought together and joined by fusion welding into a cylindrical band. Next, the band is cold rolled to form a partial corrugated surface having two main annular outwardly projecting flattened surfaces or rolling surfaces 22. The rolling surfaces are centrally spaced from each other in a transverse direction and have recessed flattened surfaces 24 disposed therebetween and recessed annular surfaces 26 on the outsides thereof. The rolling surfaces facilitate trundling the completed barrel from place to place.

A bung opening is preferably disposed between the rolling surfaces 22 so as to be protected thereby.

THE BUNG PATCH PLATE ASSEMBLY

The feature of novel construction and that which is the subject of the invention is the bung patch plate assembly, indicated at 28, and which serves to reinforce and protect the bung opening.

The patch plate assembly comprises an inner patch plate 30 having a flanged bung sleeve 32 which is integrally formed in the inner patch plate; a bung support casting 34 which surrounds the bung sleeve and is disposed above the inner patch plate 30; and an outer patch plate 36 which also surrounds the bung sleeve 32 and is spaced by the bung support casting 34 from the inner patch plate 30.

A central plate section is cut or punched out at one point along the center band 16 which is approximately rectangular in configuration and lobated at the ends extending in a circumferential direction. The lobated ends 38 represent a part of the rolling surfaces 22. The punched out central plate section or "slug" performs a useful purpose to be later described.

A. *The inner patch plate and bung sleeve*

The inner patch plate 30 is constructed from the same noncorrosive material as the barrel. It is formed with a slightly convexo-concave contour, and a peripheral configuration to match the substantially rectangular, lobular ended opening in the center band 16 from which the "slug" was punched. The inner concave surface 40, as seen for example in FIGS. 2–4, permits rapid drainage and facilitates cleaning when installed in the completed barrel.

Figure 2:
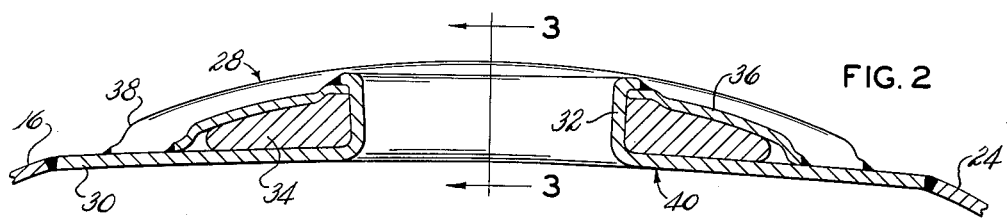
FIG. 2 is a sectional elevation along line 2—2 of FIG. 1 illustrating the extruded bung sleeve constituting a part of the inner patch plate, the bung support positioned about the sleeve and the outer patch plate welded to the top surface of the inner patch plate.
Figure 3:
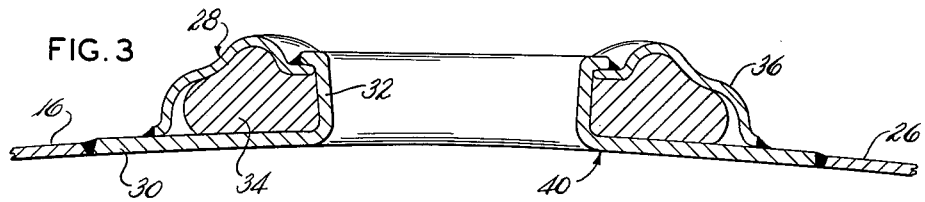
FIG. 3 is a sectional elevation along line 3—3 of FIG. 2 illustrating the relationship of the bung sleeve and the protecting rolling surfaces.

The inner patch plate 30 is fabricated from heavier stock than the barrel because of the attendant stresses and strains to which it will be subjected during the lifetime of the completed barrel. It also permits the bung sleeve 32 to be extrude from its medial portion; as illustrated in FIGS. 2 and 3.

In practice, the sleeve extrusion is usually limited to "quarter" barrel construction. This is because it is not considered feasible to attempt to extrude a deeper projecting bung sleeve, such as is desired for "half" barrel construction.

Figure 4:
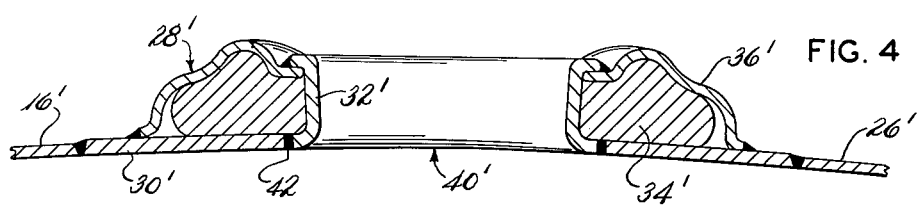
FIG. 4 is a similar view as FIG. 3, illustrating a modified embodiment wherein the bung sleeve is welded to the inner patch plate.

FIG. 4 illustrates a modified patch plate assembly 28' for a "quarter" barrel construction whereby the bung sleeve 32' may be integrally secured within the inner patch plate 30' by fusion welding, as indicated at 42, rather than being extruded.

Figure 5:
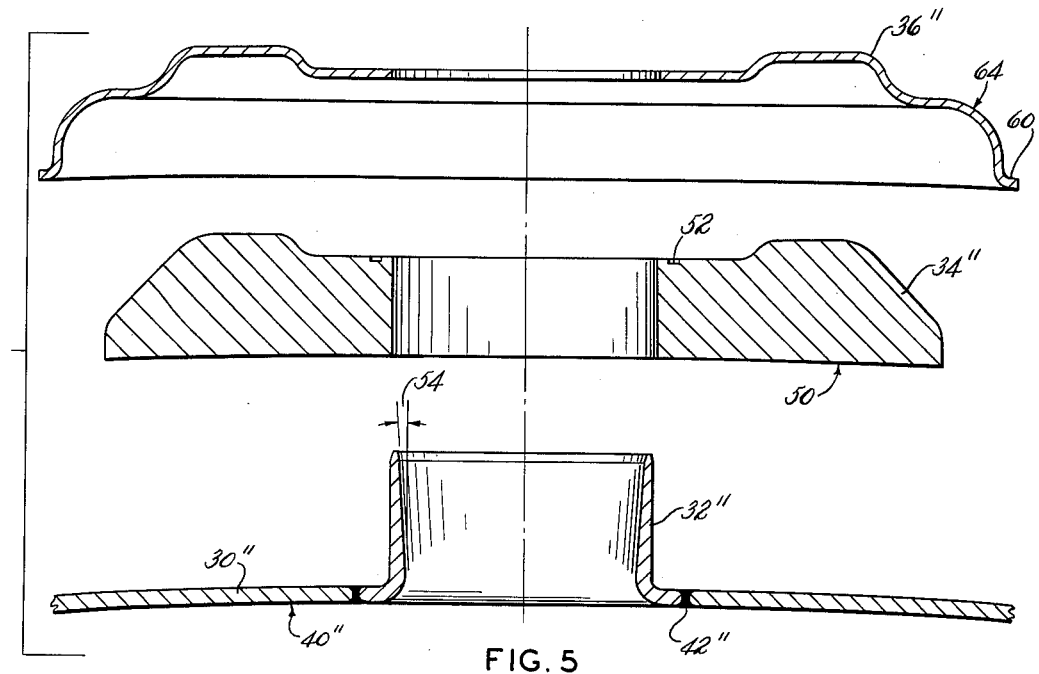
FIG. 5 is an exploded view, in sectional elevation, illustrating the order of assembly of the modified construction of a larger container or barrel.
Figure 6:
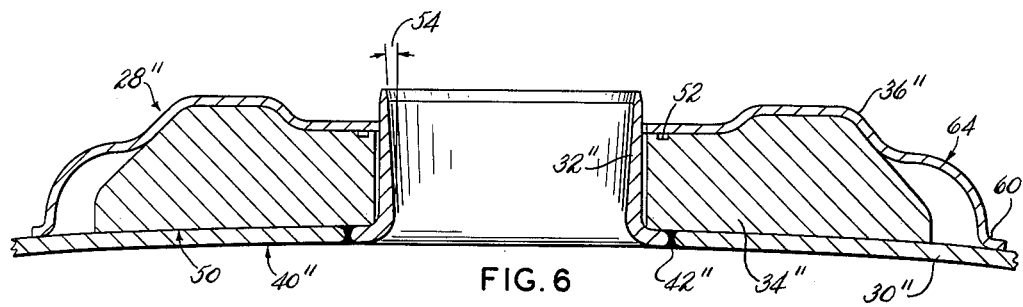
FIG. 6 is a sectional elevation of the assembled elements of FIG. 5, prior to welding but after the bung sleeve has been given a taper.
Figure 7:
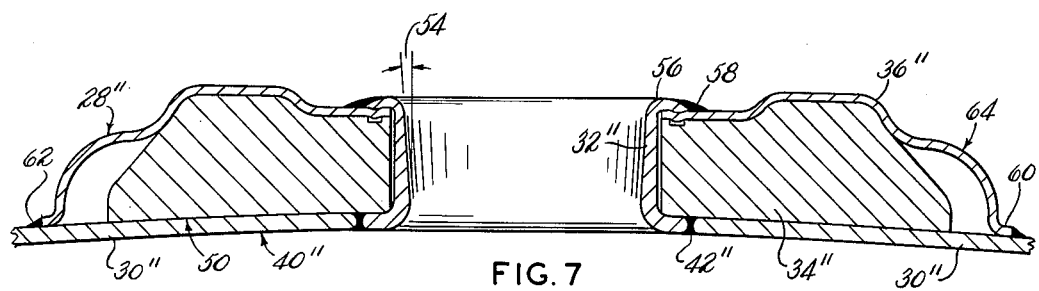
FIG. 7 is a similar view to FIG. 6 after the bung sleeve has been flanged at its top, and the parts have been welded into the completed patch plate assembly.

FIGS. 5–7 are similar to the modification shown in FIG. 4 in that the bung sleeve 32" is also secured by fusion welding, as indicated at 42", rather than being extruded. The construction illustrated by these figures shows a bung patch plate assembly 28" to be used in a "half" barrel, and with the exception of a deeper projecting bung sleeve 32", is the same in all other respects as that illustrated in FIG. 4. Accordingly, each of the single primed reference numbers employed in FIG. 4 and each of the double primed reference numbers employed in FIGS. 5–7 correspond to similar elements as depicted in FIGS. 1–3, whether or not specifically mentioned in the body of this description.

B. *Bung support casting*

The outer patch plate 36 is supported and spaced from the inner patch plate 30 by the bung support casting 34 and 34' as may be observed from FIGS. 2–7 wherein cross sectional views of this supporting relationship are illustrated.

Figure 8:
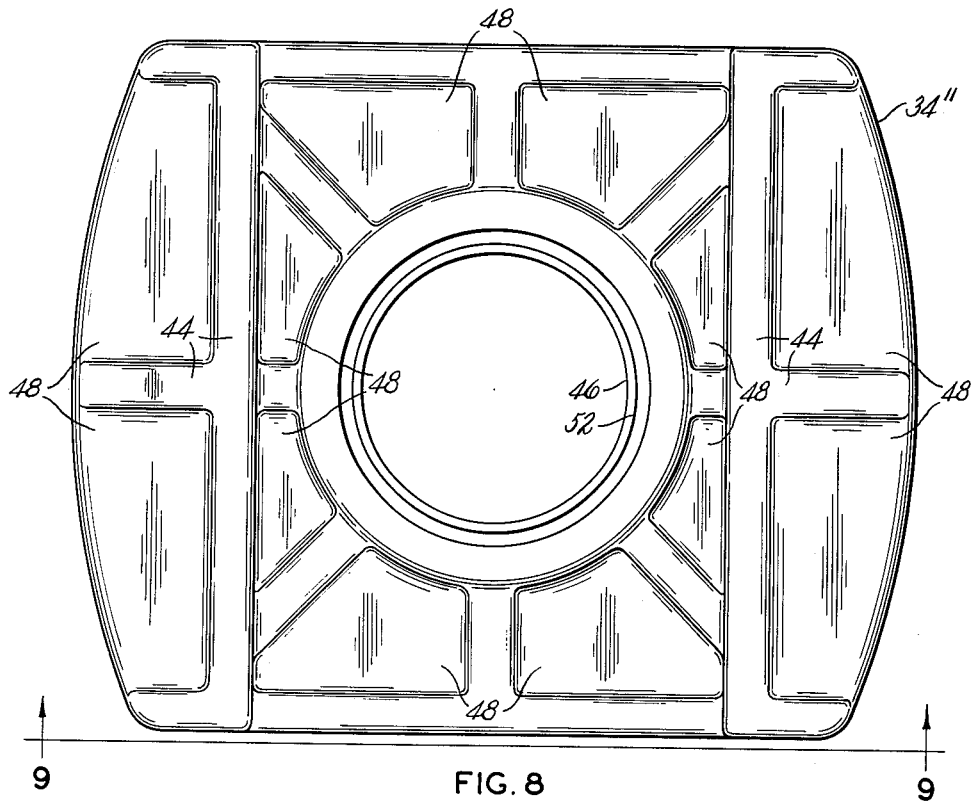
FIG. 8 is a plan view of the bung support casting employed in "half" barrel construction but having the same configuration as the casting used in the smaller barrel.
Figure 9:
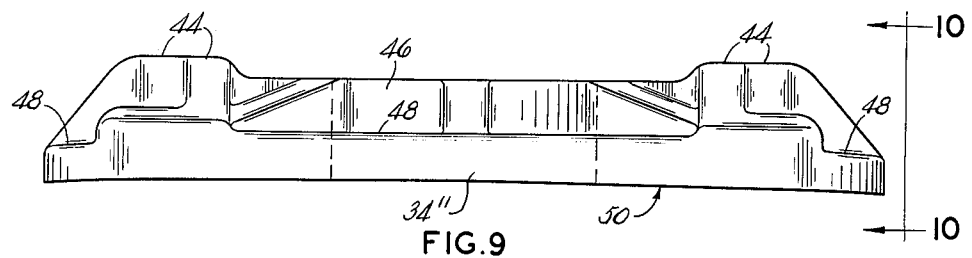
FIG. 9 is a profile elevational view of the bung support casting, as on line 9—9 of FIG. 8.
Figure 10:
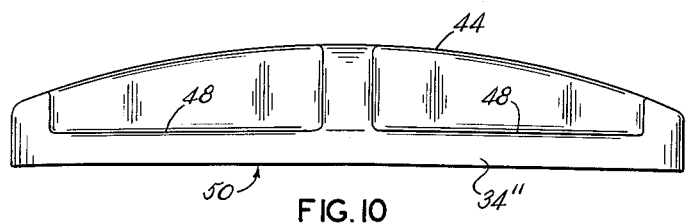
FIG. 10 is a profile of an end view of the bung support casting, as on line 10—10 of FIG. 9.

The bung support preferably is cast from aluminum or an aluminum alloy because it produces a strong but lightweight article of manufacture; however, other suitable material may be used. In FIGS. 8–10, it may be observed that the bung support casting 34" is not solid but actually has a waffle-like pattern. The high areas or ribs 44 of the pattern are located so as to support those portions of the outer patch plate 36" which will be subjected to stress and hard use, such as the rolling surfaces 22", and in the manner designed distribute the stresses over a wide area. The ribs in the medial portion of the bung support are lower in profile, as may be observed from FIG. 9, than those in the outer portions to correspond to the reduced intermediate area between the rolling surfaces of the outer patch plate 36". These latter ribs radiate inwardly from the outer ribs toward a collar 46.

The collar 46 is adapted to fit loosely around the bung sleeve 32" so that it may readily slip thereover during the assembly stages. The loose fit also is necessary for the resulting expansion of the bung sleeve 32" when it is given a taper in a subsequent operation, which will be later described. The purpose of the collar 46 is to support the bung sleeve 32" against undesirable distortion and stress when the bung plug (not shown) is driven in with sharp force.

The core prints 48 or the areas between the ribs are depressed so as to reduce the weight of the bung support casting 34". The bottom surface of the bung support is smooth and is cast in such manner so that it has slight concavity, as seen at 50 in FIGS. 5, 9 and 10, to match the convexity of the upper surface of the inner patch plate 30".

The annular recess 52, seen in FIGS. 5 and 8, is concentric with the collar 46 and serves a purpose which will be described later.

C. *The outer patch plate*

The central plate section or "slug" which was punched out from the center band 16 is restamped in order that its outer peripheral edges may be rounded off and made to project downwardly and then outwardly into a lip-like flange. An aperture is punched in the medial portion of the "slug," which is preferably at the time of restamping, and adapted to fit over and around the bung sleeve 32, 32', 32". The "slug," as now formed, constitutes the outer patch plate 36, 36', 36".

D. *The assembly*

In FIG. 5 an exploded view of the parts before assembling into the completed bung patch plate assembly 28 is illustrated. Although the illustration shows the construction used in the "half" barrel, it is equally applicable to the "quarter" barrel.

The bung sleeve 32 in FIGS. 2–3, 32' in FIG. 4 or 32" in FIGS. 5–7 is initially extruded or secured to the inner patch plate 30, 30' or 30" so as to project substantially normal to the inner patch plate 30, 30', 30". This is necessary in order to permit the bung support casting 34, 34', 34" and outer patch plate 36, 36', 36" to be readily inserted thereover.

In FIG. 6 the parts are shown in their assembled form and the bung sleeve 32, 32', 32" has been given a taper 54, preferably about 4 degrees. As may be noted from this figure, the outer patch plate 36 has not been welded to the inner patch plate 30".

In FIG. 7, the bung sleeve has been flanged, as indicated at 56 and the flange is welded to the outer patch plate 36", as indicated at 58. The outer patch plate is fusion welded at its peripheral flanged lip 60 to the upper surface of the inner patch plate 30", as indicated by the weld at 62 and thereby the bung support casting 34" is sandwiched between the inner and outer patch plates around the bung sleeve.

The heretofore mentioned annular recess 52 in the bung support casting 34 is disposed approximately below the location of the weld whereby the flange of the bung sleeve is secured to the outer patch plate. The recess is provided so that the casting itself will not contact the outer patch plate at the point of weld and serve as a chill block, and thus prevent obtaining a more uniform weld.

As may be observed from FIGS. 6 and 7 for example, the bung support casting 34" does not entirely fill the space between the inner and outer patch plates. The restamped "slug" when rounded off, as indicated at 64, results in unusual strength and rigidity and therefore it is not necessary to extend the bung support casting 34" outwardly in supporting relationship to the aforementioned shoulder 64. This results in a further economy of the amount and weight of metal used in the casting.

Inasmuch as the ribs 44 of the bung support casting 34 conform closely to the inside surface of the outer patch plate 36 and the bung sleeve 32 is closely adjacent to the weld which secures the sleeve to the inner patch plate 30, as shown in FIGS. 4–7, the danger of a crack in the weld and any undesired seepages into the space between the inner and outer patch plates is eliminated for all practical purposes. In tests conducted over a period of time it has never been known for the weld at that location to crack. Furthermore, if a crack should ever develop, it is readily detectable because of its proximity to the bung opening.

The preferred embodiment of FIGS. 2 and 3 results in a bung patch plate assembly in which all welds between the inner patch plate and barrel cavity are eliminated, and the welds securing the assembly together can be readily inspected and repaired without cutting off one of the end shells of the completed barrel.

The completed patch plate assembly is fusion welded within the punched out opening in the center band 16, and the center band is then fusion welded to the end shells 12 and 14.

In viewing the completed center band as secured to the end shells, there is only a slight interruption in the annular rolling surfaces due to the patch plate assembly, but which interruption has no effect in rolling the barrel from one plate to another.

What is claimed is:

1. The method of forming a reinforced bung opening in a single wall metallic container having a patch plate, comprising:
   forming a bung sleeve on and extending outwardly of said plate;
   applying an apertured reinforcing member around said bung sleeve and fitting against said patch plate inwardly of the outer perimeter of said patch plate;
   applying an apertured outer plate over said reinforcing member with its apertured inner edge contacting said bung sleeve and its outer edge abutting said patch plate inwardly of the outer perimeter thereof;
   and welding said inner edge to said bung sleeve and said outer edge to said patch plate by exterior welds.

2. The method of forming a reinforced bung opening in a single wall metallic container having a patch plate, comprising:
   forming a bung sleeve on and extending outwardly of said plate;
   applying an apertured reinforcing member around said bung sleeve and fitting against said patch plate inwardly of the outer perimeter of said patch plate;
   applying an apertured outer plate over said reinforcing member with its apertured inner edge contacting said bung sleeve and its outer edge abutting said patch plate inwardly of the outer perimeter thereof;
   tapering said bung sleeve;
   and welding said inner edge to said bung sleeve and said outer edge to said patch plate by exterior welds.

3. The method of forming a reinforced bung opening in a single wall metallic container having a patch plate, comprising:
   forming a bung sleeve on and extending outwardly of said plate;
   applying an apertured reinforcing member around said bung sleeve and fitting against said patch plate;
   applying an apertured outer plate over said reinforcing member with its apertured inner edge contacting said bung sleeve and its outer edge abutting said patch plate inwardly of the outer perimeter of said patch plate;
   tapering said bung sleeve and forming an annular flange on its upper edge;
   and welding said apertured inner edge to said annular flange and said outer edge to said patch plate by welds exterior of the inner surfaces of said patch plate and barrel.

4. The method of forming a reinforced bung opening in a single wall metallic container, comprising:
   cutting out a portion of the side wall of said container;
   forming a patch plate to fit within the opening in the side wall left by said cut out portion;
   forming a bung sleeve on and extending outwardly of said patch plate;
   applying an apertured reinforcing member around said bung sleeve and fitting against said patch plate;
   forming an aperture in said cut out portion and applying the apertured cut out portion over said reinforcing member with the inner edge of said aperture contacting said bung sleeve and the outer edge of said cut out portion abutting said patch plate exteriorly and inwardly of the periphery thereof;
   and welding said inner edge to said bung sleeve and said outer edge to said patch plate.

5. The method of forming a reinforced bung opening in a single wall metallic container, comprising:
   cutting out a portion of the side wall of said container;
   forming a patch plate to fit within the opening in the side wall left by said cut out portion;
   forming a bung sleeve on and extending outwardly of said patch plate;
   applying an apertured reinforcing member around said bung sleeve and fitting against said patch plate;
   forming an aperture in said cut out portion and applying the apertured cut out portion over said reinforcing member with the inner edge of said aperture contacting said bung sleeve and the outer edge of said cut out portion abutting said patch plate exteriorly and inwardly of the outer periphery thereof;
   tapering said bung sleeve;
   and welding said inner edge to said bung sleeve and said outer edge to the exterior surface of said patch plate.

6. The method of forming a reinforced bung opening in a single wall metallic container, comprising:
   cutting out a portion of the side wall of said container;
   forming a patch plate to fit within the opening in the side wall left by said cut out portion;
   forming a bung sleeve on and extending outwardly of said patch plate;
   applying an apertured reinforcing member around said bung sleeve and fitting against said patch plate;
   forming an aperture in said cut out portion and applying the apertured cut out portion over said reinforcing member with the inner edge of said aperture contacting said bung sleeve and the outer edge of said cut out portion abutting said patch plate exteriorly and inwardly of the outer periphery thereof;
   tapering said bung sleeve and forming an annular flange on its upper edge;

and welding said inner edge to said annular flange and said outer edge to the exterior surface of said patch plate.

7. The method of constructing a reinforcing bung patch plate assembly for a bung opening in a barrel, comprising the steps of:
   forming a bung sleeve in the center of a metal plate;
   positioning a bung support over said bung sleeve and on top of said metal plate;
   inserting a second plate over said bung sleeve and on top of said bung support;
   tapering the bung sleeve;
   forming a flange on the upper end of said bung sleeve and forcing it against said second plate;
   securing said flange to said second plate and securing the second plate to the top surface of the first said plate inwardly of the outer periphery thereof to form a completed patch plate assembly;
   and inserting said patch plate assembly into an opening cut out of the side wall of said barrel and securing it integrally with said side wall.

8. The method of making a patch plate assembly for a container comprising the steps of:
   cutting out a portion of the side wall of said container;
   stamp forming an inner patch plate to fit within the opening left by said cut out portion;
   extruding a bung sleve from the center of said inner patch plate;
   positioning a bung support casting upon the inner patch plate around said bung sleeve;
   reforming the said cut out portion to conform substantially to the upper surface of said bung support casting and positioning it on top of said bung support casting around said bung sleeve;
   securing the lower marginal edges of said cut out portion to the top surface of the inner patch plate exteriorly and inwardly of the outer perimeter thereof;
   securing the bung sleeve projecting through the medial portion of said cut out portion to the top surface thereof to form a completed patch plate assembly;
   and inserting the completed patch plate assembly into the opening in the side wall left by the cut out portion and making it integral with said side wall.

References Cited by the Examiner

UNITED STATES PATENTS

| | | | |
|---|---|---|---|
| 2,015,193 | 9/1935 | Reed | 113—120 |
| 2,035,714 | 3/1936 | Meyer et al. | 113—120 |
| 2,339,544 | 1/1944 | Stanley | 113—120 |
| 2,381,385 | 8/1945 | Kuhn | 113—120 |
| 2,381,386 | 8/1945 | Kuhn | 113—120 |
| 2,476,826 | 7/1949 | Conger | 113—120 |

CHARLES W. LANHAM, *Primary Examiner.*

UNITED STATES PATENT OFFICE
CERTIFICATE OF CORRECTION

Patent No. 3,223,062                      December 14, 1965

Harry Mulder

It is hereby certified that error appears in the above numbered patent requiring correction and that the said Letters Patent should read as corrected below.

Column 5, line 48, for "plate" read -- place --; column 6, line 36, after "the" insert -- outer --.

Signed and sealed this 25th day of October 1966.

(SEAL)
Attest:

ERNEST W. SWIDER                      EDWARD J. BRENNER
Attesting Officer                        Commissioner of Patents